(12) United States Patent
Teyeb et al.

(10) Patent No.: US 9,031,564 B2
(45) Date of Patent: May 12, 2015

(54) HANDOVER ROBUSTNESS IN CELLULAR RADIO COMMUNICATIONS

(75) Inventors: Oumer Teyeb, Stockholm (SE); Angelo Centonza, Winchester (GB); Konstantinos Dimou, Stockholm (SE); Walter Muller, Upplands Vasby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/376,379

(22) PCT Filed: Oct. 26, 2011

(86) PCT No.: PCT/SE2011/051271
§ 371 (c)(1),
(2), (4) Date: Jan. 29, 2013

(87) PCT Pub. No.: WO2013/019153
PCT Pub. Date: Feb. 7, 2013

(65) Prior Publication Data
US 2014/0148174 A1   May 29, 2014

Related U.S. Application Data

(60) Provisional application No. 61/515,225, filed on Aug. 4, 2011.

(51) Int. Cl.
| | |
|---|---|
| *H04W 36/00* | (2009.01) |
| *H04W 36/08* | (2009.01) |
| *H04W 36/22* | (2009.01) |
| *H04W 36/32* | (2009.01) |
| *H04W 76/04* | (2009.01) |

(52) U.S. Cl.
CPC .......... *H04W 36/0083* (2013.01); *H04W 36/08* (2013.01); *H04W 36/22* (2013.01); *H04W 36/32* (2013.01); *H04W 76/048* (2013.01)

(58) Field of Classification Search
CPC .. H04W 36/0083; H04W 36/08; H04W 36/32
USPC ...................................... 455/441, 422.1, 436
See application file for complete search history.

(56) References Cited

U.S. PATENT DOCUMENTS

| | | | |
|---|---|---|---|
| 7,212,818 B2 | 5/2007 | Haumont | |
| 7,228,135 B2 * | 6/2007 | Gromakov et al. | ........... 455/440 |
| 8,565,753 B2 * | 10/2013 | Hamabe et al. | ............... 455/423 |
| 8,588,057 B2 * | 11/2013 | Dimou et al. | ................. 370/216 |

(Continued)

FOREIGN PATENT DOCUMENTS

WO   WO-2006137779   12/2006

OTHER PUBLICATIONS

International Search Report and Written Opinion, Application No. PCT/SE2011/051271, dated Jun. 26, 2012, 20 pages.

(Continued)

*Primary Examiner* — Asghar Bilgrami
(74) *Attorney, Agent, or Firm* — Blakely Sokoloff Taylor & Zafman, LLP

(57) ABSTRACT

An indication of the speed of movement of a UE in a radio communications system is received (801) at a network node of the radio communications system. The parameters of the radio communications system are then analyzed (803) using the speed of movement indication. The system parameters are then adjusted (805) using the analysis.

16 Claims, 8 Drawing Sheets

(56) References Cited

U.S. PATENT DOCUMENTS

| | | | |
|---|---|---|---|
| 8,588,781 B2* | 11/2013 | Belschner et al. | 455/436 |
| 2007/0258407 A1* | 11/2007 | Li et al. | 370/331 |
| 2009/0163223 A1 | 6/2009 | Casey | |
| 2009/0201884 A1 | 8/2009 | Chaponniere | |
| 2010/0093350 A1 | 4/2010 | Wang et al. | |
| 2010/0130205 A1 | 5/2010 | Jung et al. | |
| 2010/0173626 A1 | 7/2010 | Catovic et al. | |
| 2010/0240368 A1* | 9/2010 | Fox et al. | 455/435.3 |
| 2010/0298001 A1 | 11/2010 | Dimou et al. | |
| 2010/0330982 A1 | 12/2010 | Ishii et al. | |
| 2011/0122779 A1 | 5/2011 | Meirosu et al. | |
| 2011/0244859 A1* | 10/2011 | Tsuda | 455/436 |
| 2012/0100857 A1* | 4/2012 | Belschner et al. | 455/436 |
| 2012/0264434 A1* | 10/2012 | Zou et al. | 455/437 |
| 2012/0329461 A1* | 12/2012 | Teyeb et al. | 455/437 |
| 2013/0023302 A1* | 1/2013 | Sivanesan et al. | 455/525 |
| 2013/0137432 A1* | 5/2013 | Wong | 455/436 |
| 2013/0171995 A1* | 7/2013 | Fujishiro et al. | 455/441 |

OTHER PUBLICATIONS

Guangxi Zhu et al., "Load Balancing Based on Velocity and Position in Multitier Cellular System," 2006, 5 pages, IEEE.
3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," Jun. 2011, 194 pages, V10.4.0, 3GPP.
3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 10)," Jun. 2011, 294 pages, V10.2.0, 3GPP.
3GPP TS 36.355, "Evolved Universal Terrestrial Radio Access (E-UTRA); LTE Positioning Protocol (LPP) (Release 10)," Jun. 2011, 116 pages, V10.2.0, 3GPP.
3GPP TR 36.902, "LTE; Evolved Universal Terrestrial Radio Access Network (E-UTRAN); Self-configuring and self-optimizing network (SON) use cases and solutions (Release 9)," 23 pages, May 2011, V9.3.1, 3GPP.
3GPP TS 36.423, "LTE; Evolved Universal Terrestrial Radio Access Network (E-UTRAN); X2 Application Protocol (X2AP) (Release 10)," Jun. 2011, 134 pages, V10.2.0, 3GPP.
International Preliminary Report on Patentability, Application No. PCT/SE2011/051271, dated Oct. 17, 2013, 10 pages.
"High Speed Optimization When Entering/Leaving CELL_DCH State," Vodafone Group. 3GPP TSG RAN WG2 #56. R2-063083. Nov. 6-10, 2006. pp. 1-3; Riga, Latvia.
"Universal Mobile Telecommunications System (UMTS) Radio Resource Control (RRC) Protocol specification," 3GPP TS 25.331, version 10.4.0; Release10; Jun. 2011; 1879pgs.

* cited by examiner

HANDOVER ROBUSTNESS IN CELLULAR RADIO COMMUNICATIONS

CROSS-REFERENCE TO RELATED APPLICATIONS

This application is a National stage of International Application No. PCT/SE2011/051271, filed Oct. 26, 2011, which claims priority to U.S. Provisional Patent Application Ser. No. 61/515,225 filed Aug. 4, 2011 both incorporated by reference Herein, the priorities of which are hereby claimed.

TECHNICAL FIELD

The present disclosure relates to the field of adjusting parameters in cellular radio communications and, in particular, to adjusting operational system parameters using mobility information regarding mobile devices.

BACKGROUND

Handover is one of the important aspects of any mobile communication system, in which the system tries to assure service continuity for the User Equipment (UE) by transferring the connection of the UE from one cell to another referred to as a Handover (HO). HO decisions usually depend on several factors such as signal strength, load conditions, service requirements, etc. The provision of efficient and effective handovers (minimum number of unnecessary handovers, minimum number of handover failures, minimum handover delay, etc.), may affect not only the Quality of Service (QoS) of the end user but also the overall mobile network capacity and performance.

In Long Term Evolution (LTE), UE-assisted, network controlled handover is used (3GPP TS 36.300, Third Generation Partnership Project Technical Specification No. 36.300). The network configures the UE to send measurement reports and, based on these reports, the UE can be handed over, to the most appropriate cell. A UE measurement report configuration consists of the reporting criteria (whether it is periodic or event triggered) as well as the measurement information that the UE is required to report.

In Evolved Universal Terrestrial Radio Access Networks (E-UTRAN), the decision to handover from the current serving evolved Node B (eNB) to a target eNB is made within the serving eNB and is made on the basis of measurements on the downlink (DL). These measurements are performed by the UE that measures the DL signals it receives from the different eNBs that it can receive.

The following event-triggered criteria are specified for intra-RAT (Radio Access Technologies) measurement reporting in LTE (3GPP TS 36.331):

Event A1: Serving cell becomes better than absolute threshold;
Event A2: Serving cell becomes worse than absolute threshold;
Event A3: Neighbor cell becomes better than an offset relative to the serving cell;
Event A4: Neighbor cell becomes better than absolute threshold;
Event A5: Serving cell becomes worse than one absolute threshold and neighbor cell becomes better than another absolute threshold.

The most important measurement report triggering event related to handover is A3, and its usage is illustrated in FIG. 1.

The triggering conditions for event A3 can be formulated as the Equation below:

$$N > S + (H_S + CIO_{S,N})$$ (Equation)

where N and S are the signal strengths of the neighbor and serving cells, respectively, $H_S$ is the hysteresis parameter that the serving cell applies for event A3, and $CIO_{S,N}$ is the Cell Individual Offset (CIO) set by the serving cell for that specific neighbor cell. If this condition is satisfied and it remains valid for a certain duration known as Time To Trigger (TTT), then the UE sends a measurement report to the serving eNB (e-UTRAN, evolved UMTS Radio Access, Node B). FIG. 1 shows signal strength on the vertical axis and time on the horizontal axis. A first solid line curve, shown high at time 0 is the signal strength of the signal received from the serving cell S. This is shown as declining in strength over time as the UE moves away from S and toward the neighboring cell N. The signal strength at N is low at time 0 and increases as the UE moves toward N.

The value for $S+(H_S-CIO_{S,N})$ is indicated by the dotted line in FIG. 1. Event A3 is satisfied at point A and a measurement report is sent at point B in time. Point A and Point B are separated by the TTT. When it gets the measurement report, the serving eNB makes a decision whether to initiate a handover toward the neighbor.

Handover in LTE is performed via an X2 connection, whenever available, and if not, using S1 (i.e. involving the Core Network (CN)). The X2 Handover process is shown in FIG. 2. The handover procedure can be sub-divided into three stages: preparation (initiation); execution; and completion. During the preparation stage (steps 1 to 3 of FIG. 2), based on the measurement results (step 2), the source eNB is getting from the UE, the source eNB decides whether to handover the connection to another eNB or not (step 3). Then a handover execution stage (steps 4 to 7 of FIG. 2) is entered and the decision to handover is communicated to the target eNB (step 4), and if the target eNB is able to admit the UE (step 5), a message is sent to the UE (steps 6 and 7) to initiate the handover. DL (Downlink) data arriving at the source eNB for the UE are then forwarded to the new target eNB (step 8).

The handover completion stage is entered once the target eNB and the UE are synchronized (steps 9 and 10) and a handover confirm message (step 11 of FIG. 2) is received by the target eNB. After a proper setup of the connection with the target eNB is performed (steps 12 and 13) (which include the switching of the DL path in the serving gateway, step 14, 15, 16), the old connection is released (step 17) and any remaining data in the source eNB that is destined for the UE is forwarded to the target eNB. Then normal packet flow can ensue through the target eNB.

As explained above, handover in LTE is controlled via several parameters. Incorrect parameter settings can lead to several problems such as (see e.g. 3GPP TS 36.902, 3GPP TS 36.300) radio link failure, ping pong handover, handover failure, etc.

A Radio Link Failure (RLF), is a failure that occurs when a radio link connection is lost for a predetermined time duration. For RLF, if the parameters are set in such a way that the UE does not report handover measurements on time, the UE might lose the connection with the original cell before handover is initiated. This is one example, of what is known as Too Late HO in which the UE tries to re-establish the connection with another cell after the RLF detection timers have expired. On the other hand, if the parameters are set to trigger handover very early, RLF might occur shortly after handover in the target cell. This is known as Too Early HO in which the UE tries to re-establish the connection with the source cell after the RLF detection timers have expired. Even if the handover is triggered at the right time, incorrect settings of the CIO can make the UE handover to the wrong cell, which is followed by a RLF and a re-establishment request in a cell other than the target cell or the source cell. This is known as HO to a wrong cell In a ping pong handover, improper handover parameter settings can make the UE handover back and forth between two neighboring cells. An example of this is a setting that makes the triggering conditions for the handover events (A3) valid between the source and neighbor cells at the same time.

When the UE receives a certain number of (N310) consecutive "out of sync" indications from the physical layer, it assumes a physical layer problem is ensuing, and a timer (T310) is started. If the UE does not receive a certain number of (N311) consecutive "in sync" indications from the lower layer before T310 expires, RLF is detected. RLF is also detected when a random access problem is indicated from the MAC (Media Access Control) layer or upon indication that the maximum number of RLC (Radio Link Control) layer retransmissions has been reached.

Another type of failure is a HO failure in which the radio link between the UE and network was functioning correctly, but handover signaling messages failed to be exchanged. This might be due to congestion or because a maximum number of RLC (Radio Link Control) retransmissions was reached. When the UE receives an HO command (i.e. RRC Connection Reconfiguration Request with mobility Control Info, as shown in FIG. 2), it starts a timer (T304), and if this timer expires before the HO is completed (i.e. RRC Connection Reconfiguration Complete message is sent by the UE), an HO failure is detected.

When a RLF is detected by the UE, the UE starts a timer (T311) and tries to re-establish the connection to the best available cell (e.g. the source cell, another cell belonging to the same source eNB or a neighbor cell belonging to another eNB). When sending the re-establishment request (RRC Connection Reestablishment Request), the UE includes the following information (3GPP TS 36.331):

Global Cell ID (GCID) of the last cell the UE was connected to before RLF;

UE Identity: the Cell Radio Network Temporary Identifier (C-RNTI) as well as MAC ID for context lookup;

Re-establishment cause: whether the request is due to handover failure, reconfiguration failure, or other causes.

If the UE context is found in the cell (if it is the source cell or if it was a cell prepared for handover, (i.e. handover was ongoing when the RLF happened and the cell where the UE re-appeared already has the UE context, which was communicated to it from the source cell during Handover Request message exchange), the connection is re-established. Otherwise (if UE context is not available, or re-establishment did not succeed before T311 expires), then the UE has to go to idle mode and has to tear down all the active bearers, if any, and might restart the bearer setups, if required.

The eNB to which the UE is reconnecting, either through a successful RRC Re-establishment or via RRC Connection Setup after idle mode, can ask for more detailed information about the failure after the connection is completed via the UE Information Request procedure, where the eNB can ask for the RLF report. The UE responds by sending a UE Information Response message with a detailed RLF report which can include information such as (3GPP TS 36.331):

Measurement result of the last served cell before RLF;

Measurement result of the neighbor cells performed before RLF;

Location info, which can include last co-ordinates as well as velocity of the UE when RLF was detected;

CGI (and if that is not available Physical Cell ID (PCI)) of the cell where RLF occurred;

and, if the RLF occurred after the reception of a HO command (i.e. RRC Connection Reconfiguration message including the mobility Control Info), then also;

The CGI where this message was received;

The elapsed time since the reception of this message; and

The RLF type: i.e. whether it is a normal radio link failure or a handover failure.

Configuring all the HO parameters manually is expensive and can be very challenging. As such, Mobility Robustness Optimization (MRO) has been introduced in 3GPP to automate the dynamic configuration of handover parameters. Mobility Robustness Optimization (MRO) tries to gather statistics on the occurrence of Too Late HOs, Too Early HOs and HO to the wrong cell, and these statistics are used to adjust the handover parameters such as Hysteresis, CIO and TTT.

For MRO, the different HO problems discussed above are communicated between neighboring cells in different ways (3GPP TS 36.300, 3GPP TS 36.423, and 3GPP TS 36.331).

For Too Late Handovers, an RLF INDICATION message is sent via X2 from the eNB to which the UE tries to re-establish a connection to the eNB where the RLF occurred. The RLF INDICATION message contains:

Physical Cell Identifier (PCI) of the cell in which the UE was connected prior to RLF (known as failure cell);

E-UTRAN Cell Global Identifier (ECGI) of the cell where RRC re-establishment attempt was made;

UE Identity: C-RNTI and MAC ID of the UE in the failure cell; and RLF report (in a UE RLF Report Container Information Element (IE)).

If an eNB receives an RLF INDICATION message from a neighbor eNB, and if it finds out that it has sent a UE CONTEXT RELEASE message towards that neighbor eNB within the last Tstore_UE_cntxt seconds (i.e. it means that very recently the concerned UE was handed over properly to it from the same eNB), the eNB responds by sending a HANDOVER REPORT message that indicates Too Early Handover.

If an eNB receives an RLF INDICATION message from a neighbor eNB, and if it finds out that it has sent a UE CONTEXT RELEASE message towards another neighbor eNB within the last Tstore_UE_cntxt seconds (i.e. it means that very recently the concerned UE was handed over properly to it from another eNB), the eNB responds by sending a HANDOVER REPORT message that indicates Handover to the Wrong Cell.

The HANDOVER REPORT message contains:

Type of detected handover problem (Too Early Handover, Handover to Wrong Cell);

ECGI of source and target cells in the handover;

ECGI of the re-establishment cell (in the case of Handover to Wrong Cell); and

Handover cause (signaled by the source during handover preparation).

Thus, by analyzing the received RLF INDICATION and HANDOVER REPORT messages within a certain duration, eNBs can configure the optimal HO parameters to be used with their neighbors.

As mentioned above, current mechanisms such as MRO try to optimize mobility by fine tuning mobility thresholds such as CIOs with the objective of preventing further failures to occur.

Failures can also occur when a UE is moving at a high speed. LTE provides for speed dependent scaling of measurement-related parameters. UE speed information may be used to adjust cell reselection (cell reselection thresholds) and handover parameters (TTT). The UE can currently estimate its speed (high, medium, normal, known as the mobility state of the UE) based on a Mobility State Parameters configuration received from the eNB. The number of handovers in a given time is used to determine the mobility state as high, if there are many handovers, medium, if there are a medium level of handovers, and low, if there are few handovers in the given time. Thus, in the case of handover, the UE calculates its mobility state and the TTT may be adjusted accordingly by multiplying the TTT with a scaling factor associated with each mobility state.

SUMMARY

It is an object to improve the operation of a cellular radio communications system using mobility information. This information may be useful in analyzing handover failures, in balancing loads between different node of the system and in controlling operational modes of UE in the system. The mobility information may be received from the network or from UEs. It may be generated by observing UE operation or by UEs directly.

In one example an indication of the speed of movement of a UE in a radio communications system is received at a network node of the radio communications system. The parameters of the radio communications system are then analyzed using the speed of movement indication. The system parameters are then adjusted using the analysis.

In another example, a network node of a cellular radio communications system is configured to improve system functionality using speed information regarding a user equipment. The network node includes a receiver configured to receive an indication of a speed of movement of the UE, a controller configured to analyze system parameters using the speed of movement indication and to adjust system parameters, and a transmitter configured to transmit system parameter adjustments to other nodes.

In another example, the network node includes means for receiving an indication of a speed of movement of the UE, means for analyzing system parameters using the speed of movement indication and to adjust system parameters, and means for transmitting system parameter adjustments to other nodes.

Also disclosed herein is a method performed in a network node of a cellular radio communications system to hand a user equipment (UE) connected to the network node over to be connected to another network node of the cellular radio communications system. The method includes receiving a report from the other network node indicating a signal strength of the other network node measured by the UE during an attempted handover from the network node to the other network node, an indication of the speed of movement of the UE, and a time elapsed between a connection request by the UE and a failure of the connection, analyzing the handover report to determine whether the handover failure is due to UE speed, and adjusting mobility thresholds for the UE toward neighbor network nodes.

The disclosed method may also include receiving a handover failure report, that includes an indication of the size of the other network node, and wherein analyzing includes analyzing using the size of the other network node. The method may include sending a mapping table to the UE indicating priorities for network nodes of the cellular radio communications system. The mapping table may include scaling factors for analyzing received signal strength for handover to each network node of the mapping table. The mapping table may include times to trigger between a time of a reduction in signal strength of one network node and a time of an increase in signal strength of another network node for determining when to handover to each network node of the mapping table. The disclosed method may also include prioritizing target network nodes for the UE depending on UE mobility.

Also disclosed herein is a network node of a cellular radio communications system that hands a user equipment (UE) connected to the network node over to be connected to another network node of the cellular radio communications system. The network node includes a receiver to receive a report from the other network node indicating a signal strength of the other network node measured by the UE during an attempted handover from the network node to the other network node, an indication of the speed of movement of the UE, and a time elapsed between a connection request by the UE and a failure of the connection, and a controller to analyze the handover report to determine whether the handover failure is due to UE speed, and to adjust mobility thresholds for the UE towards neighbor network nodes.

Also disclosed herein is a network node that includes means for receiving a report from the other network node indicating a signal strength of the other network node measured by the UE during an attempted handover from the network node to the other network node, an indication of the speed of movement of the UE, and a time elapsed between a connection request by the UE and a failure of the connection, means for analyzing the handover report to determine whether the handover failure is due to UE speed, and means for adjusting mobility thresholds for the UE towards neighbor network nodes.

Also disclosed herein is a method performed in a network node of a cellular radio communications system to balance distribution of user equipments (UEs) over multiple network nodes of the cellular radio communications system. The method includes selecting candidate UEs to move from the network node to another network node as a load balancing move, receiving speed of movement information for a candidate EU, determining whether a selected candidate UE has a high speed, and excluding the selected candidate UE from a load balancing move if the selected candidate UE is determined to have a high speed.

The disclosed method may also include comparing the received speed of movement information to a threshold speed. Receiving speed of movement information may include receiving speed information as an information element of location information regarding the selected move candidate. Receiving speed information may include receiving speed information as an information element of a failed handover report.

Also disclosed herein is a method performed in a network node of a cellular radio communications system to increase use of an idle mode by a UE in the cellular radio communications system. The method includes determining that a UE has high speed and low traffic, commanding the UE to move to an idle mode after transmission, receiving a connection request from the UE when the UE has additional data to transmit, and sending information to another network node of the radio communications system that the UE has been commanded to move to an idle mode upon determining that the UE has moved near the other network node.

The disclosed method may also include the UE returning to the idle mode after transmitting the additional data, and waking from the idle mode to receive transmitted data. The connection request may be a request to connect to the other network node. Information may be sent to the other network node as part of the connection request, or as an information element of UE history information. In addition, the idle mode may be an idle mode forced by a network node.

[The techniques described above allow UEs to be handled differently in different situations. In particular, high mobility UEs, as determined by UE velocity relative to the size of the cells are treated differently to provide less overhead and more robust handover. Current approaches provide one configuration for all types of UEs (high speed and low speed) and for all types of target cells (very small, small, medium and large).

By differentiating on the basis of UE speed and target cell size, UE performance is improved by avoiding mobility failures that result in Key Performance Indicator (KPI) and Quality of Service (QoS) degradations. Load distribution in the radio network is made more dynamic and robust by selecting a more reliable cell for traffic offloading. UE power consumption may also be reduced by minimizing the number of cells for which the UE needs to collect and report measurements and by reducing the amount of mobility signaling generated by the UE. Network performance is also improved by reducing handover failures and radio link failures. Finally, network scalability is improved by reducing the amount of handover signaling towards the core network.

The operations of the flow and signaling diagrams are described with reference to exemplary embodiments. However, it should be understood that the operations of the flow diagrams can be performed by variations other than those discussed with reference to these other diagrams, and the variations discussed with reference to these other diagrams can perform operations different than those discussed with reference to the flow diagrams.

BRIEF DESCRIPTION OF THE DRAWINGS

The present disclosure may best be understood by referring to the following description and accompanying drawings. In the drawings.

DETAILED DESCRIPTION

Figure 1:
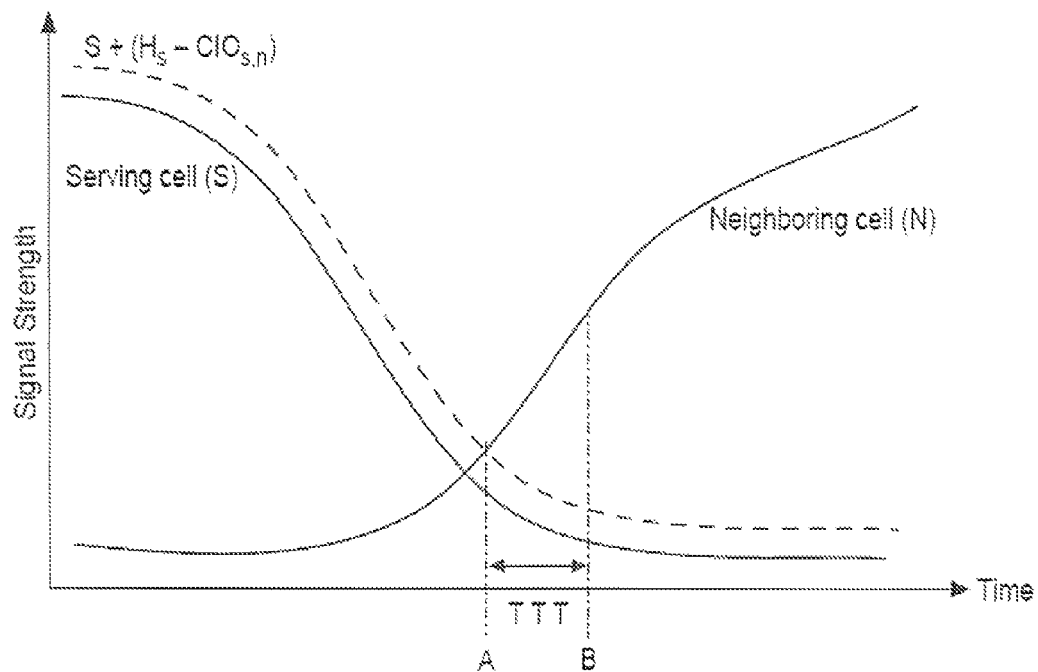
FIG. 1 is a diagram of a graph illustrating the determination of a time for handover according to standards for LTE.
Figure 2:
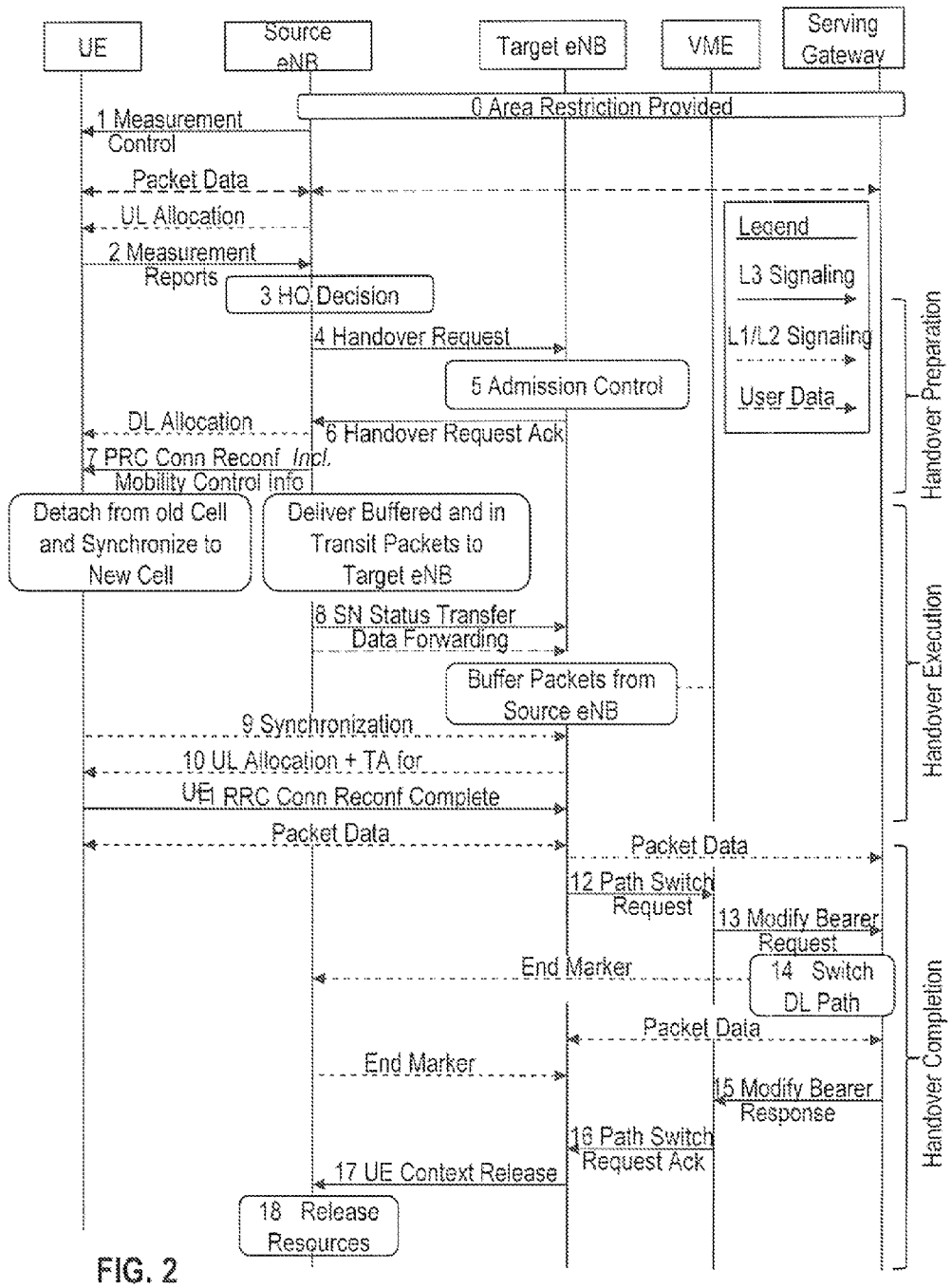
FIG. 2 is a signaling diagram illustrating signaling and equipment operations performed for a handover according to standards for LTE.

In the following description, numerous specific details such as logic implementations, opcodes, means to specify operands, resource partitioning/sharing/duplication implementations, types and interrelationships of system components, and logic partitioning/integration choices are set forth.

It will be appreciated, however, by one skilled in the art that the different implementations may be practiced without such specific details. In other instances, control structures, gate level circuits and full software instruction sequences have not been shown in detail in order not to obscure the description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A user may communicate using user equipment (UE) via a communications system and send and receive data to other UEs in the system or outside the system. Access to the communications system may be provided by a fixed line or wireless communication interface, or a combination of these. Examples of wireless access systems providing mobility for UEs include cellular access networks, various wireless local area networks (WLANs), wireless personal area networks (WPANs), satellite based communication systems and various combinations of these. A communication system typically operates in accordance with a standard and/or a set of specifications and protocols which set out what the various elements of the system are permitted to do and how that should be achieved. For example, it is typically defined if the user, or more precisely user device, is provided with a circuit switched or a packet switched communications, or both. Also, the manner in which communication should be implemented between the user device and the various elements of the communication and their functions and responsibilities are typically defined by a predefined communication protocol. Various functions and features are typically arranged in a hierarchical or layered structure, so called protocol stack, wherein the higher level layers may influence the operation of the lower level functions. In cellular systems a network entity in the form of a base station provides a node for communication with mobile devices in one or more cells or sectors. In certain systems a base station is called 'Node B'. Typically the operation of a base station apparatus and other apparatus of an access system required for the communication is controlled by a particular control entity, such as a base station controller, mobile switching center, or packet data support node.

The present disclosure is described in the context of the third generation (3G) mobile communications systems of the universal mobile telecommunications system (UMTS) and, in particular, long term evolution (LTE). A particular example of LTE is the Evolved Universal Terrestrial Radio Access (E-UTRA). An Evolved Universal Terrestrial Radio Access Network (E-UTRAN) includes E-UTRAN Node Bs (eNBs) which are configured to provide base station and control functionalities. However, the invention is not so limited.

In the following description and claims, the terms "UE" and "User Equipment" are used to refer to remote terminals, mobile devices or radios, subscriber equipment and any other type of mobile device that may connect to more than cell and experience a handover. The term "handover" also includes "handoff." The term "eNB" or "cell" is used generally to refer to a base station, an access point, a fixed terminal and similar devices and to the area of radio coverage of a base station, a cell, or a sector. The description is presented in the context of LTE for illustration purposes, but the invention is not so limited.

In LTE, mobility is used to refer to handover and handover protocols in general, as in mobility robustness optimization (MRO). It is also used to refer to an information element that indicates the speed with which a UE moves through cells. The information element may have one of three values, high, medium, and low. This mobility is related to the speed with which the UE moves across the ground and to an LTE parameter referred to as horizontal velocity. In the following description and claims, mobility is used to refer to both handover in a general sense and the rate at which a UE travels. The rate at which a UE sends and receives data will be referred to in other terms, such as data rate, high or low traffic, etc.

Though the standardized MRO mechanisms described above may be very useful, they have limitations, specifically in Heterogeneous Network (HetNet) scenarios. HetNet is an environment in which the cells have different sizes, i.e. the land area covered by different eNBs is different. The cells involved in mobility are a mixture of large coverage layer cells and small hot spot coverage cells aimed at increasing capacity in a very localized way.

The success of UE mobility in a HetNet scenario strongly depends on the time the UE is expected to spend on a given cell (i.e. how big the cell is and how fast the UE is moving). If this is not considered, UEs may experience unnecessary handovers (e.g. a fast moving UE may be handed over to a small sized neighbor cell and then very quickly handed over to another neighbor) or even failures (e.g. after the handover of a high speed UE to a small sized neighbor is initiated, the UE may move so far away from the small cell that the target cell signal may become very weak by the time handover is completed and failure may occur).

While the current use of UE mobility state parameters help to improve HO robustness, the drawbacks of this way of handover parameter adjustment, especially in a HetNet scenario include:

The speed calculation based on a number of handovers is not accurate even in a homogenous network, and it becomes even worse in a HetNet;

All neighbors are treated equally. For example, the UE adjusts the TTT to the same value whether the concerned target is a big macro cell or a very small pico cell; and The TTT is optionally adjusted in a speed dependent manner but no other parameters are adjusted at all, and the same CIO is used regardless of the UE's speed, which may greatly undermine the benefit of adjusting the TTT.

Overview

In one context described herein, UEs moving at high speeds are not handed over to small area cells. This is because the UE will remain physically in the cell for a very short time. It may also be because of a high probability of mobility failures due to the small area of the target cell. The cell's signal may become very weak by the time the handover is completed. Therefore, for UEs moving at high speed, the handover target cell may be selected not only on the basis of the strongest received signal but also on the basis of the risk of handover failure or on the basis of the target cell being small compared to the speed of the UE. For these UEs, the best target may be a wide coverage cell.

However, if source cell mobility parameters such as TTT are adjusted to allow fast moving UE's to jump small target cells and to select larger coverage cells, then this same adjustment in a slow moving UE may degrade the mobility performance. Slow moving UEs, by contrast, may be better handed over to small coverage cells because they might be able to camp on such cells for a long time while moving at slow speed. Current mobility solutions do not allow handover target selection to differentiate on the basis of the UE speed and target cell size.

In a first area of the disclosure, UEs in high speed mobility are treated differently as a consequence of mobility failures. In another area of the disclosure, high speed UEs are treated differently for Mobility Load Balancing (MLB) between neighbor cells. MLB allows a cell in overload to offload some of its UEs by triggering mobility to a less loaded cell. However, if a UE is moving at relatively high speed, it may not be advisable to trigger mobility for the purpose of off-loading the serving cell. This is because this UE will most likely exit the cell in a relatively short time (therefore naturally offloading the source cell). Moreover, a UE moving at high speed is already subject to the risk of mobility failures. If the normal course of mobility procedures for such a UE is also disturbed by mobility due to load balancing reasons, the risk of mobility failure may become even higher. Hence, handover may be improved by differentiating between high speed UEs and low speed UEs for the purpose of mobility load balancing. Current solutions do not take into account UE mobility when offloading UEs to neighbor cells.

In yet another area of the disclosure, when analyzing UEs moving at high speed it is plausible to think that these UEs will handover frequently from cell to cell. If such UEs were subject to low traffic exchange, it may be beneficial to move the UEs to idle mode for as long as possible. This is because a UE in idle mode moving from cell to cell may not trigger handover signaling and may not be subject to handover failures. Recent advances in LTE technology allow UEs to be kept in a so called "always on" state. In this state, the UE is kept in RRC Connected even if there is no scheduled traffic. The "always on" state allows signaling to be saved when the UE moves from RRC idle to RRC Connected state and because the UE is already connected, it reduces end to end delays during traffic transmission.

However, for UEs with little or no traffic moving at high speed, the "always on" state has the drawback of generating high numbers of HOs, with the risk of handover failures and with issues deriving from high HO signaling levels. Therefore, in systems configured in a way to keep all UEs in the "always on" state, there might be high signaling loads and mobility performance degradation for all nearby UEs caused by a high speed UE. This issue may be solved by allowing UEs moving at high speed to be differentiated and put into idle mode as much as possible. The idle mode reduces handover failures, handover signaling, and UE measurement reporting.

The idle mode is made more effective if, in a HO, the target cell is informed that a UE has been deliberately kept in idle mode due to its high speed mobility. This is because the target may immediately adopt this configuration for the UE moving into its coverage. The target cell may move the UE to idle mode as soon as possible.

Three Areas

The present disclosure presents, inter alia, one or more of three areas of HetNet mobility. The first area is mobility optimization for high speed UEs in HetNet deployments. A cell size information element (IE) indicating the size of the cell originating the message may be added to the X2: RLF INDICATION message (radio link failure indication message). This, combined with UE speed information already contained in the UE RLF Report Container IE, allows the receiving node to adjust its target selection criteria based on UE mobility and neighbor cell size.

Further, an indication of cell size may be included for the cells involved in mobility using the UE RLF Report Container IE in the X2: HANDOVER REPORT message sent from a target eNB to a source eNB. The source eNB thus becomes aware of UE measurements taken at the time of failure and the size of the neighboring cells. This information allows the source to adjust its mobility thresholds towards neighbor cells and to prioritize certain targets depending on UE mobility.

Two mechanisms for differentiated target selection for high speed UEs may be used:
1) a per-UE, per target cell, CIO (Cell Individual Offset);
2) target prioritization at the source eNB based on previously monitored failure events.

The second area is addressed by including UE mobility information in the UE History IE, which is passed to the target eNB as part of handover messages. The mobility information may be used to evaluate whether it is appropriate to select the UE as a candidate for offloading to a neighbor cell, as it may not be beneficial to handover fast moving UEs for the sake of mobility load balancing.

Figure 3:
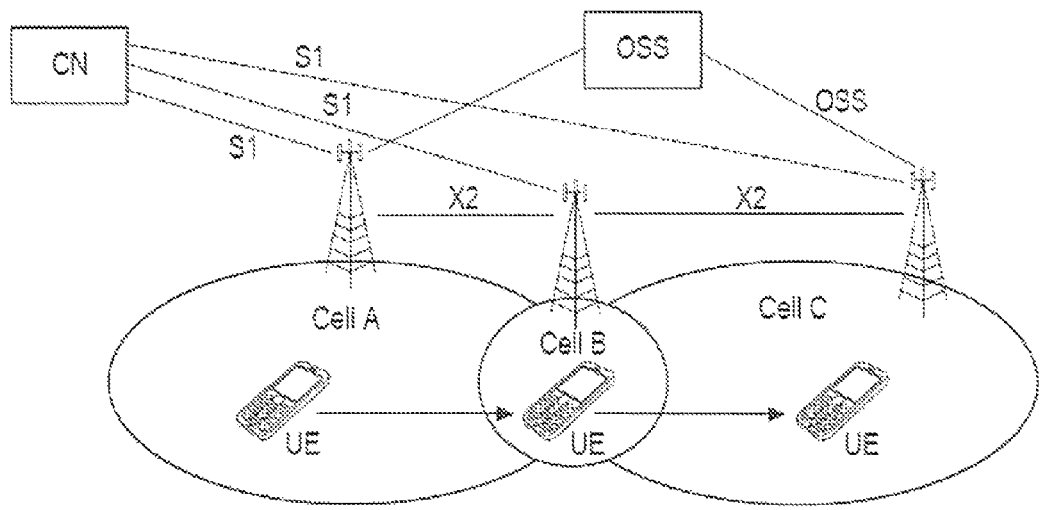
FIG. 3 is a simplified diagram of three heterogeneous radio cells traversed by a UE connected according to standards for UTRAN.
Figure 4:
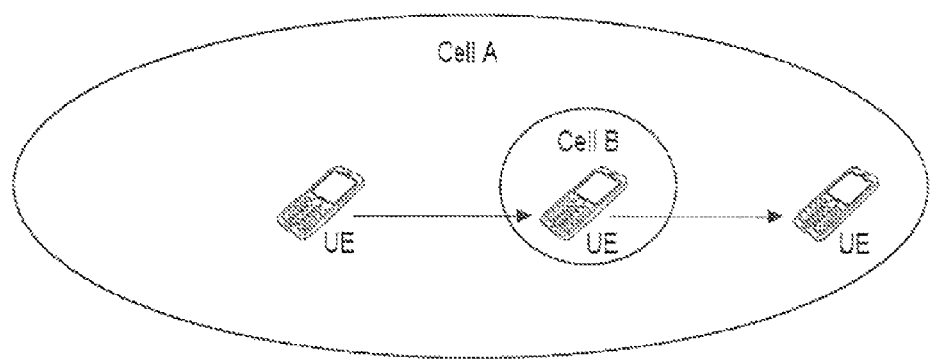
FIG. 4 is a simplified diagram of two heterogeneous radio cells traversed by a UE.

The third area is addressed by keeping a UE that has a high mobility state in idle mode as long as possible. This is to avoid frequent handovers (HOs) and instead force the UE to perform cell reselection. A flag or IE is communicated to the new target cell that the UE has been kept in idle mode due to its high mobility. Such communication may be achieved either via a new IE transmitted during handover signaling as part of the UE History Information IE or via RRC level signaling from the UE to the new target cell First Area Returning to the first area, HO performance for fast moving UEs is improved in HetNets. FIG. 3 and FIG. 4 show two examples of conditions in which UEs moving at relatively high speed may be subject to failure conditions during mobility in HetNet environments. FIG. 3 shows an example of HO failure in HetNet, with re-establishment in a third cell. In FIG. 3, a UE is quickly moving from Cell A to Cell B and then to Cell C as indicated by the arrows pointing to the right in the figure. Cell B is much smaller than Cell A and Cell C. In an attempted HO from Cell A to Cell B, due to the high speed mobility of UE, the connection to Cell B may fail. For example, Random Access Channel (RACH) access may fail or RRC Connection Reconfiguration Complete messaging may fail because the UE is not in Cell B long enough to successfully complete the HO. The UE may then successfully re-establish connection to Cell C after dropping the connection while passing through Cell B. Alternatively, the UE might succeed in connecting to Cell B but shortly afterwards be out of range of Cell B and be subject to RLF (Radio Link Failure). Again the UE may then re-establish the connection through Cell C.

FIG. 3 also shows a base station, such as an eNB, or similar structure near the center of each of the three cells. While the base stations are shown as being near the center of each cell, they may alternatively define the sides of each cell using sectorized antennas or be in any other desired configuration. In E-UTRAN, different user equipment terminals (UEs) are wirelessly connected to radio base stations (usually referred to as evolved NodeB (eNB)) and are handed over to different eNBs as they move from cell to cell, as shown. In E-UTRAN the radio base stations are directly connected to a Radio Network Controller (RNC) which controls the eNBs connected to it. The eNBs are connected to a core network (CN) via an S1 interface. The eNBs are also connected to each other via an X2 interface. An Operation and Support System (OSS) is logically connected to all the radio base stations as well as to the CN, via an OSS interface.

FIG. 4 shows an example of mobility failure in HetNet with re-establishment in the source cell. The base stations and their connections are not shown as in FIG. 3, in order to simplify the drawing, but these base stations and connections may still be present. In the example of FIG. 4, Cell B is inside of and much smaller than Cell A. In FIG. 4, after preparation to HO from Cell A to Cell B as the UE enters Cell B, the connection may fail due to the high speed mobility of UE. For example, the connection to Cell B may fail due to a failed RACH access or failed RRC Connection Reconfiguration Complete. The UE might then re-establish connection to Cell A after it has passed through Cell B. Alternatively, the UE may succeed in connecting to Cell B but shortly after be subject to RLF and re-establish connection to Cell A.

The mobility robustness optimization (MRO) solution currently standardized would not attribute the cause of mobility failures to the fact that the UE is moving above a certain speed and in a HetNet environment. It is likely that standardized MRO algorithms would not react to the failure conditions in an appropriate way. In current MRO procedure descriptions, if the UE re-establishes or re-connects to a target cell or to a third cell, then HO too early is excluded as the cause. The system will select HO too late or HO to the wrong cell depending on measurements and on the sequence of events (e.g. if the UE does not receive the HO Command, then the standard deems the failure to be HO too late, even if the actual case may be something else).

FIG. 3 and FIG. 4 correspond to the "Handover to Wrong Cell" and the "Too Early Handover" cases discussed above, respectively. The source cell A may try to reduce its cell individual offset (CIO) towards Cell B. However, this may have a negative impact on low mobility UEs which may be safely handed over to cell B, and also cell B might still be taken as a potential candidate for high mobility UEs if the right signal conditions are met. For the high mobility UEs, Cell B will most likely generate mobility failures, regardless of the measured signal quality for handover purposes. Hence there is risk in taking Cell B into consideration as a target at all for high mobility UEs, provided that other coverage cells are available.

In a first implementation, the X2: RLF INDICATION message is extended to include an optional Cell Type IE (information element) of the cell from which the message is originated. The Cell Type IE is not currently a part of the X2: RLF INDICATION message. The Cell Type IE contains the Cell Size IE and is defined in section 9.2.42 of 3GPP TS 36.423. The Cell Size IE may be extended to include more categories of cell sizes beside the currently standardized Very Small, Small, Medium and Large. The cell size is an indication of the geographic area of the cell, so that a cell with a smaller size takes less time for a UE to traverse than a cell with a larger size.

In a second implementation, the X2: HANDOVER REPORT message is extended to include an optional UE RLF Report Container IE (as defined in TS 36.423), an optional RRC Connection Setup Indicator IE (as defined in TS 36.423) and an optional Cell Type IE relative to the cell from which the X2: HANDOVER REPORT message has been originated. The X2: HANDOVER REPORT message does not currently include these IEs. This extension is more suitable for the case of "Handover to the Wrong cell".

The main aim of including the additional IEs in the RLF INDICATION and HANDOVER REPORT messages is to allow the source eNB to avoid selection of small cells for high speed UEs in the future. By using existing IEs the cost and complexity of implementation in E-UTRAN is reduced. However, instead of existing IEs, new IEs may be developed that provide more accurate and more relevant information. In other systems, which do not have the IEs similar to the additional IEs mentioned above, new or different messaging may be used to convey similar information at a similar time in the protocol. The use of the additional IEs is described in the context of FIG. 5 and FIG. 6.

Figure 5:
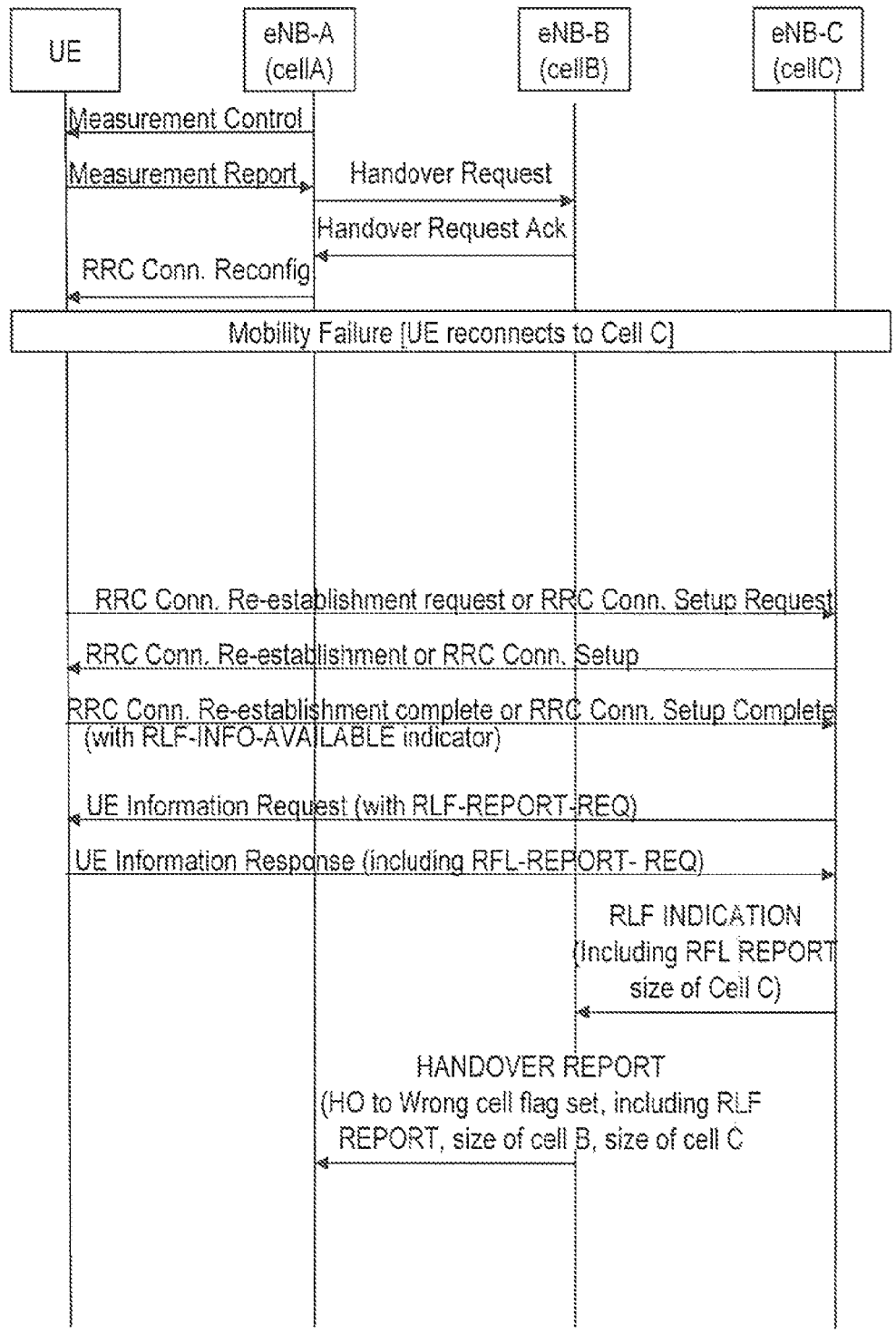
FIG. 5 is a signaling diagram of a failed handover with additional information exchange.

FIG. 5 shows enhanced signaling supporting the resolution of HO to the wrong cell. FIG. 5 shows, in time sequence from top to bottom, a Measurement Control message from Cell A to UE. This is answered by a Measurement Report from UE to Cell A. Cell A then sends a Handover Request to Cell B. Cell B answers with Handover Request Acknowledgment. Cell A then sends RRC Connection Reconfiguration to UE. If UE is high mobility as in FIGS. 3 and 4, the handover may fail and UE will try to connect to the nearest Cell, such as Cell C in FIG. 3 or Cell A in FIG. 4. In FIG. 5, UE has moved to Cell C and sends RRC Connection Re-establishment Request or RRC Connection Setup Request to Cell C. If a connection is available, then Cell C sends RRC Connection Re-establishment complete in response to the RRC Connection Re-establishment message or RRC Connection Setup Complete in response to the RRC Connection Setup Message. Both messages may include an RLF-Info-Available indicator.

With the connection complete, Cell C can then send a UE Information Request with an RLF-Report-Req. The UE may then reply by providing the RLF report in the form of a UE Information Response with the RLF-Report. Cell C may then send the RLF Indication including the received RLF Report and a cell size IE as described above to Cell B. Cell B sends an HO Report including the Cell B and Cell C size IE described above to Cell A together with the UE RLF Report Container IE that is contained in the RLF Indication message received from Cell C.

Thanks to the cell size information and to the UE speed information contained in the UE RLF Report Container IE (already present in the RLF INDICATION message), Cell A and Cell-B may deduce that the mobility failure was due to a high speed UE attempting to handover to a small cell (Cell B). Cell A may therefore exclude Cell B as target cell for high speed moving UE and prioritize Cell C.

In the scenario of Handover to Wrong Cell described in FIG. 5, the standardized solution for MRO foresees sending the RLF INDICATION message from Cell C to Cell B and thereafter sending the HANDOVER REPORT from Cell B to Cell A. However, due to the absence of cell size information from any of these messages and due to the absence of the UE RLF Report Container IE (containing UE measurements, UE speed information, failure cell details and more) from the HANDOVER REPORT, it may be difficult using the standardized MRO for the eNB serving Cell A to determine that the failure was not due to erroneous mobility settings but due to a high speed UE attempting to handover to a very small cell.

The currently standardized MRO solution specifies that if the UE re-establishes or re-connects (from idle) to the prepared target cell (Cell B) or to a third cell (Cell C), then the case of HO too early is excluded (due to the UE not going back to source cell). Whether the failure is due to HO Too Late or HO to Wrong Cell, determination of the cause of the failure depends on: 1) the interpretation of the measurements collected by the UE and embedded in the UE RLF Report Container IE and 2) the sequence of events (e.g. if the UE does not receive the HO Command, the failure is likely to be HO Too Late). Therefore, propagating the measurements in the UE RLF Report Container IE also via the HO REPORT makes it easier to accurately determine the cause of the failure.

Figure 6:
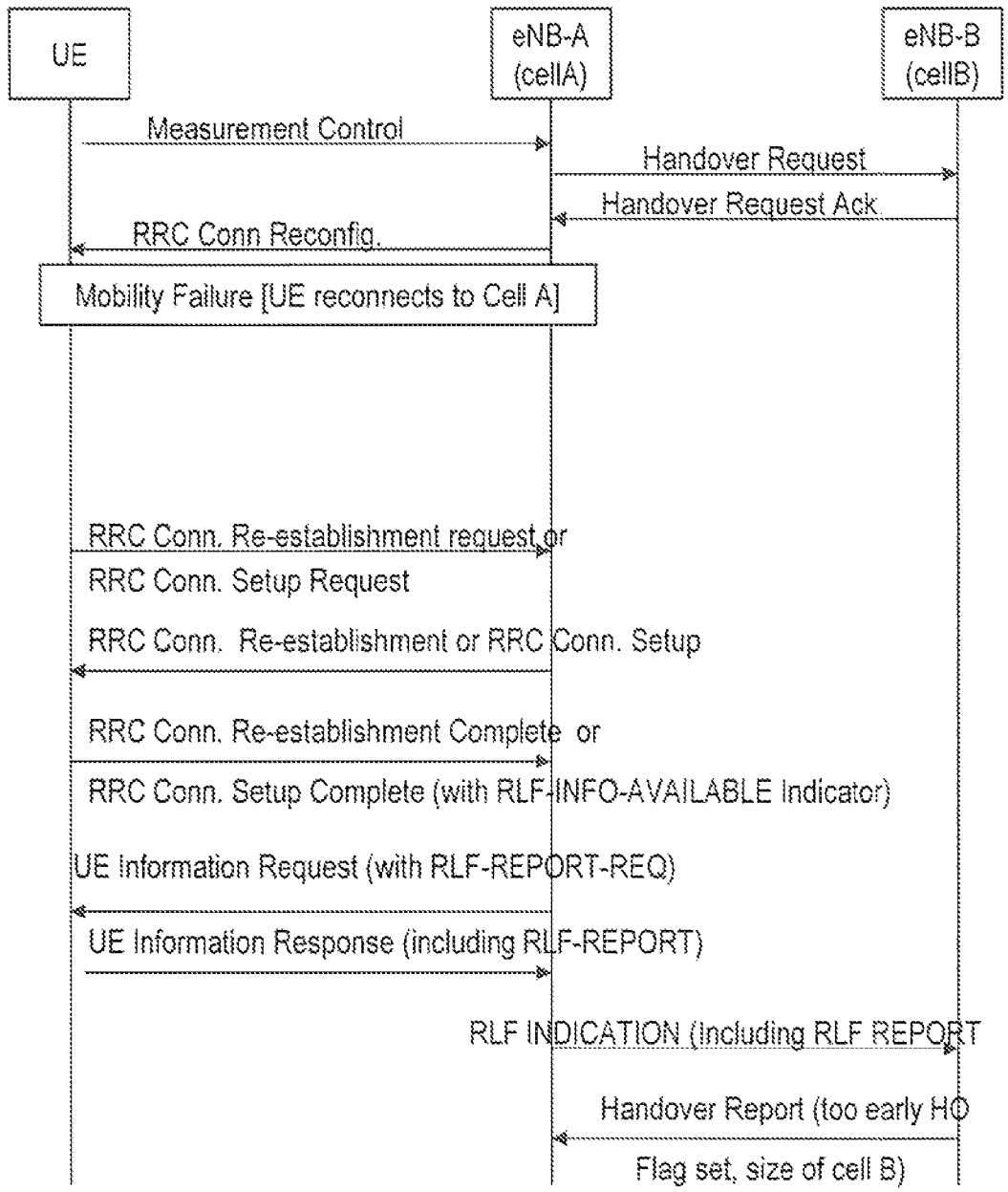
FIG. 6 is a signaling diagram of a failed handover with additional information exchange.

FIG. 6 shows an example of enhanced signaling supporting the determination that a HO failed because it was too early. In FIG. 6, Cell A sends a Measurement Control message to UE. UE responds with Measurement Report. Cell A then sends a Handover Request message to Cell B and Cell B responds with Handover Request Acknowledgment. Cell A then sends an RRC Connection Reconfiguration message to UE. The handover then fails due to the high mobility of UE. Through the failure of the handover, the signaling is the same as in the example of FIG. 5. However, in this case, corresponding to a scenario such as that of FIG. 4, UE does not reconnect and move on to Cell C but instead reconnects to Cell A. This is shown as Cell A sending RRC Connection Re-establishment Request or RRC Connection Setup Request to UE. If UE is able to connect, then it sends RRC Connection Re-establishment Complete or RRC Connection Setup Complete, depending on the type of request that it received.

Cell A having connected sends UE Information Request with and RLF-Report-Req to UE. UE responds by providing the requested report as a UE Information Response including the RLF-Report. Having received this information from the UE, Cell A, then sends RLF indication including the received RLF report to Cell B and Cell B responds with a Handover Report. The Handover Report may include have the too early HO flag set and include the IE for the size of cell B as described above.

Thanks to the cell size information and to the UE measurements collected prior to the failure (and included in RLF INDICATION), Cell A may deduce that the mobility failure was due to a high mobility UE attempting to handover to a small cell (Cell B) and that coverage on Cell A was still sufficiently good prior to handover. Cell A may therefore exclude Cell B as a target cell for a high mobility UE and allow the UE to stay on Cell A. It has been assumed above that Cell A keeps the contents of the UE RLF report that it has sent to Cell B for a certain duration, so that when the HANDOVER REPORT is received later on, Cell A can correlate to it and use the information in the HANDOVER REPORT such as the UE speed. However it is not necessary that Cell A saves the UE RLF. Alternatively, Cell C may include the UE RLF report in the HANDOVER REPORT messages, as in the case of Handover to the wrong cell discussed above.

In the scenario of Too Early Handover described in FIG. 6, the standardized MRO solution sends an RLF INDICATION to Cell B, which triggers the sending of a HANDOVER REPORT towards Cell A. Cell A is already aware of the Too Early HO. This is because when the UE re-connects to the source it will report, among various other measurements included in the RRC RLF Report, the time elapsed from reception of HO COMMAND to connection failure. It is therefore possible to understand at the source if the failure is for HO too early. In addition UE mobility information is contained in the RRC RLF Report received by the source Cell (Cell A in this case).

The RLF INDICATION message is sent to the target in order to allow the target to adjust its mobility parameters. However, due to the lack of cell size information in the HO Report message, Cell A may not understand that the mobility failure is due to a high mobility UE attempting to handover to a small cell and that such small cell is still within the coverage of Cell A.

The robustness of handover may be improved still further by providing additional parameters, such as per-target handover parameters and per-UE handover parameters. There are at least two different ways of achieving this. One way is to use per-UE, per-target CIOs. Namely, when eNB-A (Cell A, above) identifies a UE moving at relatively high speed it may assign, via signaling over UE dedicated channels, a specific CIO for Cell B (and possibly for Cell C). Such an offset will not be broadcast in Cell A system information blocks (SIBs) and it will be used only by the UE in high speed. Such a CIO may allow the UE to ignore Cell B and to either report Cell C as the best target (as shown in FIG. 3) or to remain on Cell A (as shown in FIG. 4).

An enhancement of this concept is to communicate a mapping table to the UE with a scaling factor known to the UE and applicable to different UE speeds (e.g. for speeds less than 10 Km/h apply scale factor of 1, for 10 Km/h-50 Km/h, apply a scale factor of 1.5, etc.). This may reduce the amount signaling for cases where per UE, per target CIOs are transmitted each time a speed transition is recorded (low to medium, medium to high, high to very high, etc.). This mapping may either be communicated to each UE during RRC connection setup via RRC Reconfiguration, or broadcasted over SIBs (very infrequently). UEs may then, based on their speed, pick the corresponding scaling factor and multiply the CIO by it, and use the result, for example, in the A3 event triggering calculations.

Per-UE, per-target TTTs may be sent similarly to the per-UE, per-target CIOs above, but in this case, the cell size of the candidate target cells and UE speed are employed to adjust the times to trigger (TTTs). That is, both the UE speed and the target cell size are employed to scale the TTT. Current standards only provide for scaling down the TTT for high speed UEs. For example, the scaling may be based on the expected time the UE will spend on the target, i.e. target cell size/UE speed.

eNB-A (Cell A) may receive measurement reports from the UE in high speed mobility, including several candidate cells, among which Cell B and Cell C. eNB-A will force selection of the handover target in a way to avoid handovers to Cell B. Namely eNB-A may choose Cell C (in the case of FIG. 3) or it will not initiate any handovers (in the case of FIG. 4) despite the fact that Cell B, as reported by the UE, is the best candidate for mobility.

Figure 7:
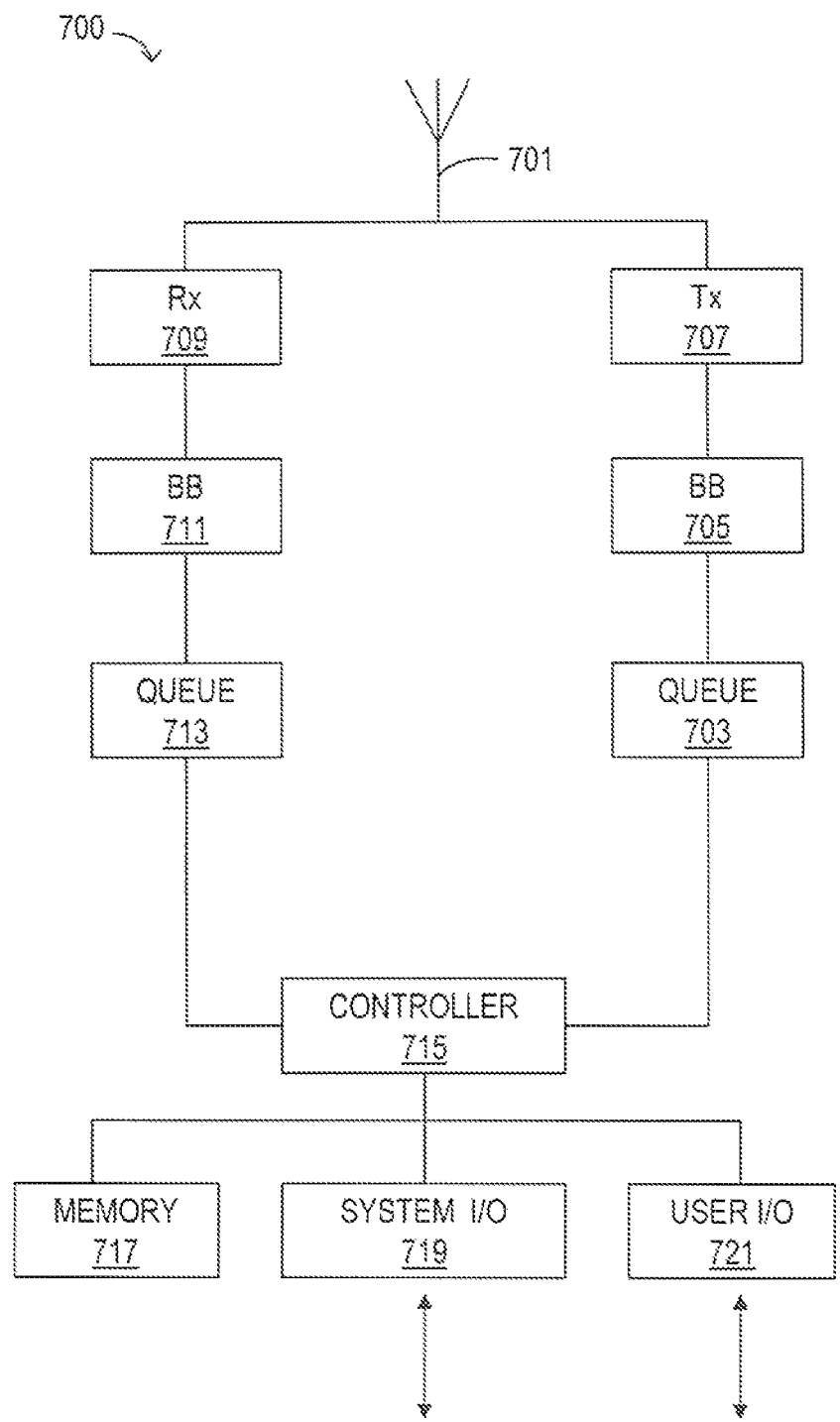
FIG. 7 is a simplified hardware block diagram of a radio terminal.

FIG. 7 is an example hardware diagram of a device architecture suitable for the UE and for a eNB. The hardware 700 includes one or more antenna elements 701. There may be separate transmit and receive arrays, sectorized or diversity antennas or a single omnidirectional antenna element. For transmission, data is collected in a transmit queue 703 from which it is transferred to a baseband modulator 705 for conversion to symbols, modulation and upconversion. A transmitter 707 further modulates and amplifies the signal for transmission through the antenna.

On the receive side, received symbols are demodulated and downconverted to baseband in a receive chain 709. The baseband system extracts a bit sequence from the received signal and generates any error detection codes that may be needed. The bit stream is stored in a receive buffer or queue 713 for use by the system.

A controller 715 controls the operation of the receive and transmit chains, applies data to the outbound queue and receives data from the inbound queue. It also generates messages to support the wireless and wired protocols over which it communicates. The controller is coupled to one or more memory systems 717 which may contain software, intermediate cached values, configuration parameters, user and system data. The controller may also include internal memory in which any one or more of these types of information and data may be stored instead of or in addition to being stored in the external memory system. The controller is coupled to a system input/output interface 719 which allows for communication with external devices and a user input/output interface 721 to allow for user control, consumption, administration and operation of the system.

In the case of an eNB, the system interface 719 may provide access over the S1, OSS and X2 interfaces to the rest of the network equipment to send and receive data, messages, and administrative data. However, one or more of these interfaces may also use the radio interface 701 or another interface (not shown). In the case of a UE, the system interface may connect to other components on the device, such as sensors, microphones, and cameras, as well as to other devices, such as personal computers or other types of wireless networks, through wireless or wired interfaces.

Figure 8:
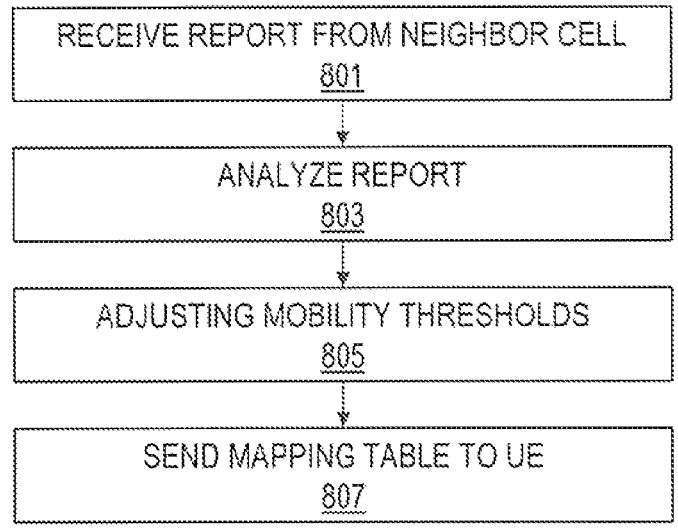
FIG. 8 is process flow diagram of improved handover robustness.

FIG. 8 is a flow diagram of an example of a process that may be performed by the cell to enhance handovers for a high mobility UE. The process is performed by a cell, here exemplified by a eNB. However, the technique may be adopted for use by any of a variety of base stations or access points using different wireless protocols and standards. The technique may be performed at the station that communicates with the UE or aspects of the process may be performed at a central location, such as a base station controller, or network administration node.

At 801, an eNB or other wireless radio station in a cellular radio communications system receives a report from another node, such as a neighbor eNB about a particular UE. This report may contain many different parameters and measures regarding the UE. The measurements may be made by the UE or by another eNB, or other type of base station or access point. In the described examples, the report includes any one or more of the signal strength measured by the UE and/or by the reporting base station during an attempted handover, the speed of the UE around the time of the handover, the time elapsed between the connection request from the UE and the failure of the connection and other information. The report may also identify the particular UE to which the report refers.

The report may include additional information such as the current location of the UE, physical parameters or characteristics of the UE, timing information including the time at which a failed handover was attempted, etc. In addition, the report may contain information about the reporting cell, in particular the size of the reporting cell, however, other information may also be included. In LTE, an RLF Indication or a Handover Report may be used. For other standards or protocols other reports may be used.

At 803, the received report is analyzed to determine causes of the failed handover. In the present example, the cell is differentiating between high speed or high mobility UEs and slower speed or lower mobility UEs. The speed of the UE may be inferred from information in the report or the speed may be measured by the UE or by the base stations and one or more speed measurements may be included in the report. For example, given a time elapsed between the connection request and the failure of the connection, the speed may be inferred. The accuracy of this speed may be improved using the signal strength of the signal from the UE. The information on speed may be used to determine whether the speed of the UE is a cause of the handover failure, as described above.

As mentioned above, the size of the target cell may also be included in the report or obtained from a lookup table stored locally or remotely. If the UE speed is high and the target cell is small, then it may often be inferred that the handover failed because of the speed of the UE. All of this information may be used to adjust mobility thresholds for the UE. The cell may store locally or at a central location a table of neighboring cells and mobility thresholds for each one. The mobility thresholds may be used to determine if a particular UE may be handed over to each respective neighboring cell. In a simple example, the mobility thresholds are signal strength thresholds. The signal strength thresholds may be the strength of the UE signal as measured by one or more of the cells, or the strength of cell signals as measured by the UE. Alternatively, timing offsets or propagation delay may be used to determine when a UE is able to be handed off to another cell. At 805, the thresholds are adjusted to accommodate the speed of the UE and sizes of the neighboring cells.

At 807, the cell may send a mapping table to the UE for the UE to use in requesting a handover or in requesting a connection. The table may include a list of neighboring cells with priorities, mobility thresholds, scaling factors, and other information for the UE to use. In a simple example, the mapping table is a list of the neighboring cells that, for a high speed UE, places a higher priority on larger cells. This will reduce the number of unnecessary or short duration handovers to small cells and allow slower UEs to make better use of smaller cells.

The thresholds may be signal strength thresholds, so that the UE will not request a connection or handover to a particular cell unless the signal received from that cell exceeds the threshold. The table may also include time offsets for how long a cell's signal must exceed the threshold before the UE requests a connection or handover. Alternatively, the time may be a TTT.

The operations of FIG. 8 may be repeated when a certain number of reports are received or periodically after a certain time interval has elapsed. These operation can occur as new reports arrive and as new UEs arrive. If a particular UE leaves the cell, then the operations will not be repeated for that UE unless it returns.

Second Area

Turning to the second area, differentiated treatment of UEs moving in high speed may be done for the purpose of Mobility Load Balancing (MLB). As mentioned above, if a UE moving at high speed is selected as a mobility load balancing candidate, failures may occur. This is because high mobility UEs undergo challenging radio conditions and are likely to exit the serving cell in a relatively short time. Forcing the UE to handover to a neighbor cell when radio conditions do not necessarily require, and when the UE permanence in the serving cell is likely to be short, may not be efficient.

In this second area, the latest version of the locationInfo IE (as defined in TS36.331) monitored by the serving cell is added to the UE History Information IE (as defined in TS36.423). The locationInfo IE may be modified to include information about the UE horizontal velocity (as defined in TS36.355) in addition to location coordinates. Horizontal velocity is a measure of the speed at which the UE travels. It provides more accuracy than UE mobility state, which may be used as an alternative. Therefore, during handover signaling the target eNB may be informed about the UE velocity at the last time it was recorded in the source cell. If the velocity is above a pre-determined threshold, the target eNB may decide not to consider such a UE as a candidate for mobility load balancing procedures.

Even without the communication of additional information, already available velocity and other information may be used to evaluate whether the UE shall be considered as a Mobility Load Balancing (MLB) candidate. There are cases in which the UE attempts to handover to a target cell but the attempt will fail and the UE will try an RRC Connection Re-establishment with a third cell (as in the case described in FIG. 3). In these cases, the eNB serving the third cell involved in the mobility procedure will not receive the UE History Information IE due to the fact that this IE is only included in the X2: HANDOVER REQUEST message.

In order to allow the eNB serving the third cell to receive UE velocity information, the RRC Connection Re-Establishment message provides an IE named RLF-InfoAvailable IE, which indicates availability of an RLF report from the UE. This report may also contain UE velocity information. The eNB serving the cell in which the UE attempts re-establishment may make use of this velocity information to determine whether to consider the UE as a candidate for MLB procedures.

Figure 9:
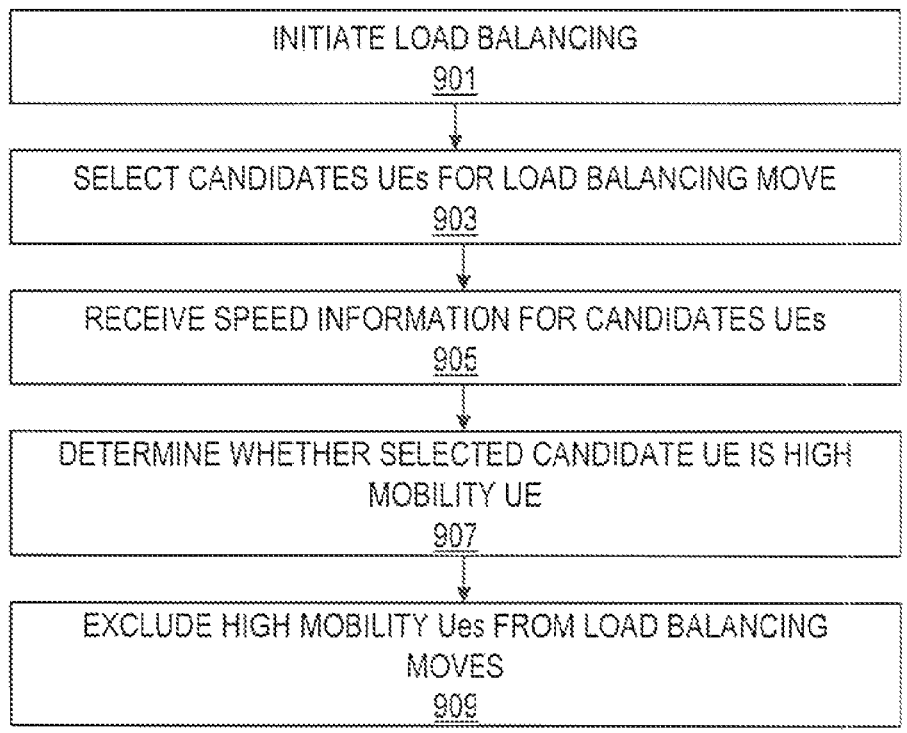
FIG. 9 is a process flow diagram of improved mobility load balancing.

FIG. 9 is an example process flow diagram implementing techniques described above to support the MLB process. FIG. 9 represents a process performed by a node in the wireless system, such as an eNB or similar device. As in the example of FIG. 8, some of the operations may be performed locally and others in a central location. Instructions, tables, and parameters may also be stored locally or centrally. At 901, the node or a related control entity determines to perform a load balancing process. The MLB process will include handing some UEs over to other cells, to distribute the load between cells more evenly.

At 903, the cell or a related entity in the system selects candidate UEs for load balancing moves. At 905, velocity information is obtained or derived for at least some of the candidate UEs. Examples of obtaining this information are provided above and in the context of FIG. 8.

At 907, the velocity information is correlated with the UE candidates for MLB. This allows all or some of the candidate UEs to be identified as high or low mobility. The UEs may be grouped into two or more different classes based on mobility and on other factors. At 909, the groupings or identifications may be used to determine whether to exclude some of the UEs from the load balancing operations. As mentioned above, high mobility UEs often move quickly out of a cell. Therefore, if a high mobility UE is moved to another cell through handover, it may very soon require another handover in the same or a different direction. On the other hand if a high mobility UE is not moved, it may very soon request a handover, or be handed over nevertheless as it move to another cell.

Third Area

Turning to the third area the frequent handover signaling generated by UEs in high mobility is addressed. UEs in high mobility are sometimes only transmitting a small amount of data traffic. Therefore, by keeping such UEs in idle mode as much as possible, failures are minimized and mobility signaling due to Active Mode handovers is also minimized. This solution is contrary to the standardized approach of keeping the UEs in "always on" mode. Such a UE is in RRC Connected mode even when it has no traffic to send or to receive. It will require handovers as it moves from cell to cell even if it does not send or receive any data.

By keeping a high mobility UE in idle mode for as long as possible it is possible to reduce the number of handovers and to force the UE to carry out cell reselection instead. Except for Tracking Area Updates done independently of connection establishment, cell reselection does not require any signaling with an eNB. Once the UE is placed into a forced idle mode status, there are at least two ways for a new cell on which the UE has camped to know that the UE has been kept in forced idle due to its high mobility and low data traffic exchange. In both examples, below, a forced idle information element is sent on a signaling bearer. However, other messages may be used instead, including various types of flags.

In one example, information about the forced idle status may be sent by the UE as UE History Information. At some point, after the UE is put into the forced idle, it will likely need to transmit to the cell station. This normally occurs by moving into an RRC Connected state in order to exchange data traffic. If the UE moves from a serving cell to a target cell during this time window, the information about the forced idle UE status may be transferred to the target cell as part of a UE History Information IE. The UE History Information IE may be extended to also include an idle mode IE. The idle mode IE specifies that the UE has been kept in forced idle in the previous serving cell.

As an alternative, the idle mode IE may be sent by the UE as part of Connection Re-establishment message. As explained above, active mode mobility may be subject to failure and the UE may try to re-establish a connection on another cell. The RRC Connection Re-establishment message may be extended to also include an idle mode IE that indicates that the UE has been kept in forced idle mode in the previously serving cell.

The addition of the new IE, regardless of how and when it is transmitted, gives the new serving eNB the opportunity to immediately move the UE back into forced idle mode and to check more frequently if the UE mobility and data transfer remain such as to justify the forced idle status.

Under the standards, if the UE moves to a different cell while in idle mode, there will be no handover signaling but purely cell reselection. In another alternative, in order to quickly inform the newly reselected cell about the forced idle mode, an idle mode IE may be added to the RRC Connection Setup message that the UE sends as soon as it needs to send or receive data. Using the idle mode IE with a connection setup messages allows the UE to send data shortly after it is necessary. Accordingly, the UE can transfer the idle mode information independent of any communication between eNBs. It is not necessary for the network to provide a UE History Information or Connection Re-establishment message. As a result, the UE in idle mode is not prevented from sending data. Instead, as soon as there is data to transmit, the UE sets up a connection. As soon as the data has been transmitted, the UE moves back to idle mode in the quickest way. This is more efficient and requires far fewer handovers that keeping the UE always on, where the UE will always be in RRC Connected mode even during long discontinuous reception (DRX) and discontinuous transmission (DTX) periods.

Figure 10:
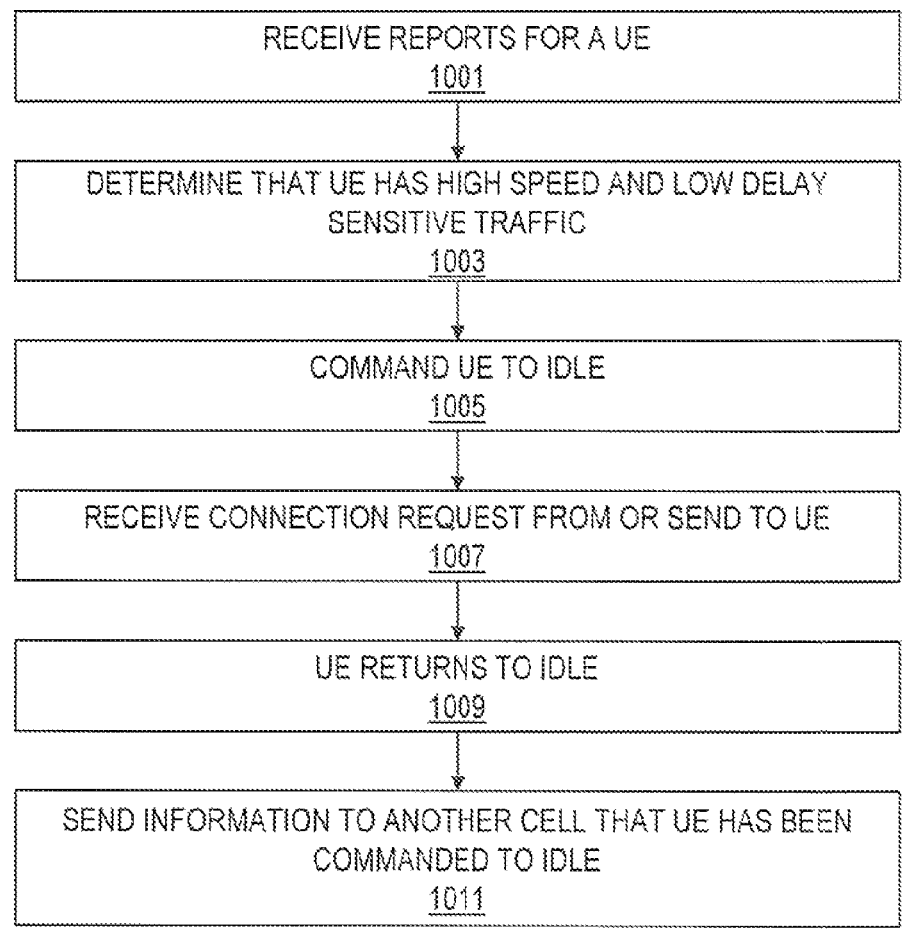
FIG. 10 is a process flow diagram of reducing signaling overhead using forced idle mode.

FIG. 10 shows an example process flow for using an idle mode with a UE to reduce handover overhead and failed handovers. At 1001, a cell receives information about one or more UEs that are registered with or connected to it. The information may come from direct observation, from the UEs directly, or from the information elements and reports described above. Any combination of these including local, neighboring, and central information sources may be used.

At 1003, the cell determines that a UE has high mobility and low traffic. The following operations are particularly useful when the low traffic is delay sensitive. This determination may be done in whole, or in part, by the cell using local or central data and processing resources. As with all of the techniques described herein, the particular speed required to qualify a UE as high mobility or high velocity and the particular data rate required to qualify a UE as low data traffic may be adapted to suit any particular implementation. In the example of failed handovers, a high mobility UE may be defined as a UE that fails to handover to a particular small cell. Alternatively, in that and other situations, the standards of high and low may be based on the amount of time required to service the UE with redundant requests, or a certain percentage of UEs may be assigned to be high and low. As a further alternative, the UE may determine a mobility or velocity value using techniques defined in the standards or in other ways such as using satellite or terrestrial location information, and measuring data communication rates over time.

In the example of FIG. 10, the high mobility, low traffic UE is ideally one that will create less signaling overhead if forced to idle without any noticeable distraction or irritation of the user. The particular thresholds to achieve this ideal will depend on the particular implementation as well as the particular UE and its geographic circumstances.

At 1005 the high mobility, low traffic UE is commanded to move to an idle state. This is also referred to herein as forced idle. Typically, such a command will be sent or executed after the UE is finished transmitting and receiving. Typically, the cell and the UE have transmit buffers. After all of the data in the transmit buffers on both sides has been transmitted and received, the UE may be idled with no adverse effect on data transmission. In one example, there is a delay time before idling, so that new data does not immediately arrive and occasion a new transmission immediately after the UE idles. In another example, a time threshold can be specified in the go to idle mode command and the UE can stay in that mode for that period, unless the speed becomes lower than a certain threshold or there is a data that needs to be transmitted. The UE may then stay in the cell or move to another cell before the condition is fulfilled to return to connected mode (i.e. before the UE has data to transmit or receive, a timer expiration, a speed change, etc.).

At some later point in time, (e.g. microseconds or minutes), at 1007, the UE has new uplink data to send and requests a connection, or the closest cell has identified the idling UE and establishes a connection with the UE to send new downlink data. The UE and the cell exchange data as necessary and then at 1009, the UE returns to idle.

For faster, more efficient operation, at 1011 the cell that determined that the UE should be forced to idle may send this information to another cell of the system. Even in idle mode, the cell, or a combination of cells, may be able to track the UE and detect when it has moved into another cell. By informing the other cell that the UE has been forced to idle, the other cell may continue to force the UE to idle. In addition, the signaling protocols between the UE and the cell may be more efficient if the cell is already aware of the status of the UE.

Conclusion

The techniques described above allow UEs to be handled differently in different situations. In particular, high mobility UEs, as determined by UE velocity relative to the size of the cells are treated differently to provide less overhead and more robust handover. Current approaches provide one configuration for all types of UEs (high speed and low speed) and for all types of target cells (very small, small, medium and large).

By differentiating on the basis of UE speed and target cell size, UE performance is improved by avoiding mobility failures that result in Key Performance Indicator (KPI) and Quality of Service (QoS) degradations. Load distribution in the radio network is made more dynamic and robust by selecting a more reliable cell for traffic offloading. UE power consumption may also be reduced by minimizing the number of cells for which the UE needs to collect and report measurements and by reducing the amount of mobility signaling generated by the UE. Network performance is also improved by reducing handover failures and radio link failures. Finally, network scalability is improved by reducing the amount of handover signaling towards the core network.

The operations of the flow and signaling diagrams are described with reference to exemplary embodiments. However, it should be understood that the operations of the flow diagrams can be performed by variations other than those discussed with reference to these other diagrams, and the variations discussed with reference to these other diagrams can perform operations different than those discussed with reference to the flow diagrams.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., a UE, an eNB, etc.). Such electronic devices store and communicate (internally and/or with other electronic devices over a network) code and data using machine-readable media, such as non-transitory machine-readable storage media (e.g., magnetic disks; optical disks; random access memory; read only memory; flash memory devices; phase-change memory) and transitory machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

The operations of the flow diagrams are described with reference to the exemplary embodiments of the other diagrams. However, it should be understood that the operations of the flow diagrams can be performed by embodiments of the invention other than those discussed with reference to these other diagrams, and the embodiments of the invention discussed with reference to these other diagrams can perform operations different than those discussed with reference to the flow diagrams.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration. The description is thus to be regarded as illustrative instead of limiting.

The invention claimed is:

1. A method implemented in a network node of a cellular radio communications system to improve system functionality using speed information regarding a user equipment (UE), the method comprising:
   receiving an indication of a speed of movement of the UE, wherein receiving an indication comprises receiving a report, from another network node indicating a signal strength measured by the UE during an attempted handover from the network node to the other cell, and a time elapsed between a connection request by the UE and a failure of the connection together with the indication of a speed of movement of the UE;
   analyzing system parameters using the speed of movement indication, wherein the system parameters comprise mobility thresholds for the UE and wherein analyzing comprises analyzing the handover report to determine whether the handover failure is due to UE speed of movement;
   adjusting the system parameters using the analysis, wherein adjusting comprises adjusting mobility thresholds for the UE with respect to neighbor cells; and
   wherein the system parameters include a list of candidate UEs to move from the network node to another network node as a load balancing move, wherein receiving an indication of speed comprises receiving speed information regarding speed of movement of a move candidate UE, and wherein the method further comprises, selecting move candidate UEs;
     determining whether a selected move candidate UE is a high mobility UE using the received speed information; and
     excluding the selected move candidate UE from a load balancing move if the selected move candidate UE is determined to be a high mobility UE.

2. The method of claim 1, wherein receiving a report comprises receiving a handover failure report, the report including an indication of the size of the other cell, and wherein analyzing includes analyzing using the size of the other cell.

3. The method of claim 1, further comprising sending a mapping table to the UE indicating priorities for cells of the cellular radio communications system, the mapping table optionally including scaling factors for analyzing received signal strength for handover to each network node of the mapping table or times to trigger for determining when to request handover to each network node of the mapping table.

4. The method of claim 1, further comprising prioritizing target cells for the UE depending on the indication of the speed of movement of the UE.

5. The method of claim 1, wherein determining whether the selected move candidate EU is a high mobility EU comprises comparing the received speed information to a threshold speed.

6. The method of claim 1, wherein receiving speed information comprises receiving speed information as an information element of location information regarding the selected move candidate or as an information element of a failed handover report, and wherein receiving speed information optionally comprises receiving speed information from the move candidate UE.

7. The method of claim 1, wherein the system parameters comprise a list of UEs that have been commanded to operate in an idle mode, the method comprising:
   determining that a UE has a high speed of movement and a low traffic data rate;
   commanding the UE to move to an idle mode after a UE data transmission; and
   receiving a connection request from the UE when the UE has additional data to transmit, the UE moving from the idle mode to send the connection request; and
   sending information to another network node of the radio communications system that the UE has been commanded to move to an idle mode upon determining that the UE has moved near the other cell.

8. The method of claim 6, wherein the UE returns to the idle mode after transmitting the additional data.

9. The method of claim 7, further comprising waking the UE from the idle mode to receive transmitted data.

10. The method of claim 7, wherein the connection request is a request to connect to another cell and the connection request, and wherein the request includes sending the information within the request as an indication that the UE has been commanded to move to an idle mode by the first cell.

11. The method of claim 7, wherein sending information comprises the UE sending information to the other network node as part of the connection request.

12. The method of claim 7, wherein sending information comprises sending information as an information element of UE history information.

13. A network node of a cellular radio communications system configured to improve system functionality using speed information regarding a user equipment (UE), the network node comprising:
- a receiver configured to receive an indication of a speed of movement of the UE, wherein the receipt further comprises the receiver configured to receive a handover report from another network node indicating a signal strength measured by the UE during an attempted handover and a time elapsed between a connection request by the UE and a failure of the connection;
- a controller configured to analyze system parameters using the speed of movement indication and to adjust system parameters, wherein the system parameters comprise mobility thresholds for the UE and wherein the analysis further comprises the controller configured to analyze the handover report to determine whether the handover failure is due to UE speed of movement;
- a transmitter configured to transmit system parameter adjustments to other nodes, wherein the network node is further configured to adjust the mobility thresholds for the UE with respect to neighbor network nodes; and
- wherein the system parameters include a list of candidate UEs to move from the network node to another network node as a load balancing move, wherein the receipt of the indication of speed comprises receiving speed information regarding speed of movement of a move candidate UE, and wherein the controller is configured to, select move candidate UEs;
  - determine whether a selected move candidate UE is a high mobility UE using the received speed information; and
  - exclude the selected move candidate UE from a load balancing move if the selected move candidate UE is determined to be a high mobility UE.

14. The network node of claim 13, wherein:
the controller is further configured to determine that a UE has a high speed of movement and a low traffic data rate;
the transmitter is further configured to transmit system parameter adjustments by commanding the UE to move to an idle mode after a UE data transmission;
the receiver is further configured to receive a connection request from the UE when the UE has additional data to transmit; and
the network node further comprises a system interface configured to send information to another cell of the radio communications system that the UE has been commanded to move to an idle mode upon the controller determining that the UE has moved near the other cell.

15. The network node of claim 13, wherein the transmitter transmits system parameter adjustment as in an information element of a UE history information.

16. A network node of a cellular radio communications system configured to improve system functionality using speed information regarding a user equipment (UE), the network node configured to:
- receive an indication of a speed of movement of the UE, wherein the receipt further comprises the network node configured to receive a handover report from another network node indicating a signal strength measured by the UE during an attempted handover and a time elapsed between a connection request by the UE and a failure of the connection;
- analyze system parameters using the speed of movement indication and to adjust system parameters, wherein the system parameters comprise mobility thresholds for the UE and wherein the analysis further comprises the network node configured to analyze the handover report to determine whether the handover failure is due to UE speed of movement;
- transmit system parameter adjustments to other nodes, wherein the network node is further configured to adjust the mobility thresholds for the UE with respect to neighbor network nodes: and
- wherein the system parameters include a list of candidate UEs to move from the network node to another network node as a load balancing move, wherein the receipt of the indication of speed comprises receiving speed information regarding speed of movement of a move candidate UE, and wherein the network node is configured to select move candidate UEs;
  - determine whether a selected move candidate UE is a high mobility UE using the received speed information; and
  - exclude the selected move candidate UE from a load balancing move if the selected move candidate UE is determined to be a high mobility UE.

* * * * *

UNITED STATES PATENT AND TRADEMARK OFFICE
CERTIFICATE OF CORRECTION

PATENT NO. : 9,031,564 B2  
APPLICATION NO. : 13/376379  
DATED : May 12, 2015  
INVENTOR(S) : Teyeb et al.

Page 1 of 1

It is certified that error appears in the above-identified patent and that said Letters Patent is hereby corrected as shown below:

In the specification

In Column 2, Line 12, delete "Access," and insert -- Access Network, --, therefor.

In Column 3, Line 47, delete "cell (if" and insert -- cell if --, therefor.

In Column 6, Line 40, delete "EU," and insert -- UE, --, therefor.

In Column 7, Line 4, delete "[The" and insert -- The --, therefor.

In the claims

In Column 22, Line 44, in Claim 5, delete "EU is a high mobility EU" and insert -- UE is a high mobility UE --, therefor.

In Column 24, Line 37, in Claim 16, delete "nodes: and" and insert -- nodes; and --, therefor.

In Column 24, Line 43, in Claim 16, delete "to" and insert -- to, --, therefor.

Signed and Sealed this  
Twenty-ninth Day of December, 2015

Michelle K. Lee  
*Director of the United States Patent and Trademark Office*